United States Patent [19]

Finneyfrock

[11] Patent Number: 5,280,933
[45] Date of Patent: Jan. 25, 1994

[54] TIP OVER RESISTANT, DEBRIS RETAINING OMNI DIRECTIONALLY MOBILIZED RACK FOR WOOD LOGS

[76] Inventor: David N. Finneyfrock, 18630 Keedysville Rd., Keedysville, Md. 21756

[21] Appl. No.: 918,757

[22] Filed: Jul. 27, 1992

[51] Int. Cl.$^5$ .............................................. B62B 3/10
[52] U.S. Cl. ........................ 280/47.34; 211/49.1; 280/79.3
[58] Field of Search .................. 280/79.3, 79.2, 79.11, 280/79.6, 47.34, 47.35, 47.18, 33.998; 211/49.1, 60.1, 189, 186; 296/35.4, 36; D34/12, 17

[56] References Cited

U.S. PATENT DOCUMENTS

| | | | |
|---|---|---|---|
| 1,915,173 | 6/1933 | Vieregge | 280/79.2 |
| 2,980,438 | 4/1961 | Baer | 280/79.3 |
| 3,021,011 | 2/1962 | Visneski | 280/79.6 |
| 3,216,585 | 11/1965 | Whittle | 211/49.1 |
| 3,669,464 | 6/1972 | Linzmeier | 280/47.34 |
| 4,189,164 | 2/1980 | Moorer | 280/87.05 |
| 4,264,081 | 4/1981 | Markitam | 280/47.34 |
| 4,326,731 | 4/1982 | Woychio | 280/641 |
| 4,413,834 | 11/1983 | Base | 280/47.26 |
| 4,469,341 | 9/1984 | Creim | 280/47.26 |
| 4,488,733 | 12/1984 | Hellsten | 280/47.16 |
| 4,523,768 | 6/1985 | Dlubula | 280/79.11 |
| 4,531,752 | 7/1985 | Diener | 280/47.18 |
| 4,679,805 | 7/1987 | Cunningham | 211/149 |
| 4,793,624 | 12/1988 | Mace | 280/47.16 |

FOREIGN PATENT DOCUMENTS 322378 6/1957 Switzerland .................. 280/79.3

Primary Examiner—David M. Mitchell
Attorney, Agent, or Firm—Abdallah & Muckelroy

[57] ABSTRACT

A fireplace implement for receiving, omni-directionally mobilizing and storing wood logs in a horizontally elongated stack, the stack being a horizontally directed array of alligned pieces of wood logs of substantially equal length such that the implement whether loaded or empty has a substantially low center of gravity provided by a bottom member of steel or the like functioning in combination with two U-shaped outer members wherein the height H of each vertical post of each U-shaped outer member is approximately equal to or less than one-half the length L of the bottom portion of each U-shaped member. The bottom member is adapted to the lower U-shape of each outer member and also functions to catch and prevent debris from the wood logs discharging underneath the implement. The bottom member is also adapted with a plurality of elongated pegs located along its edges adjacent the U-shaped members and vertically inserted entirely thru vertically alligned close tolerance apertures in the U-shaped members to brace the U-shaped members in a upright position.

3 Claims, 2 Drawing Sheets

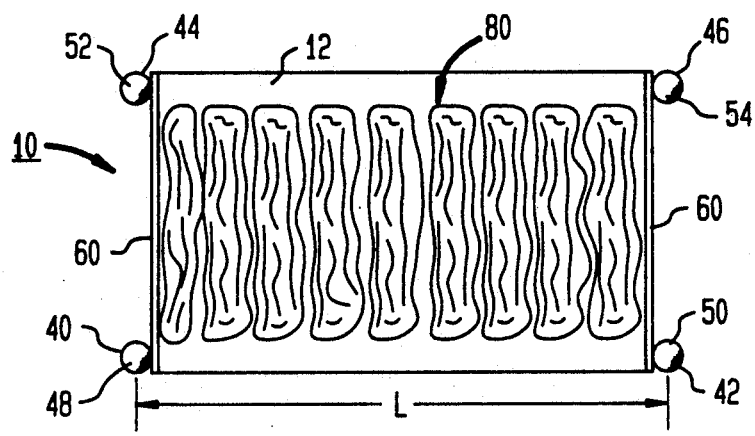
FIG. 4
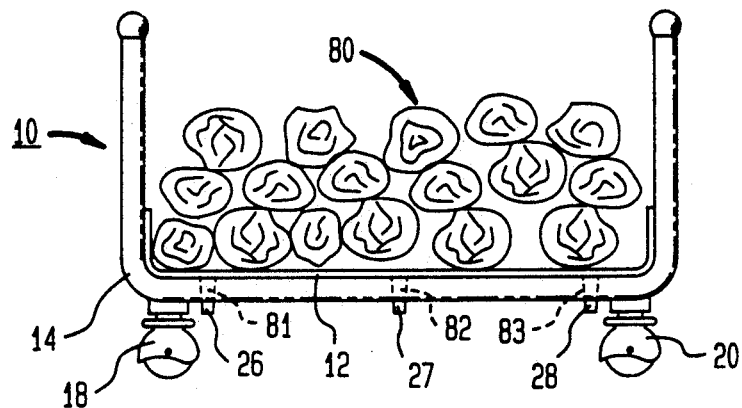
FIG. 5a
FIG. 5c
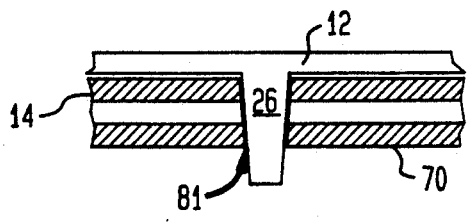
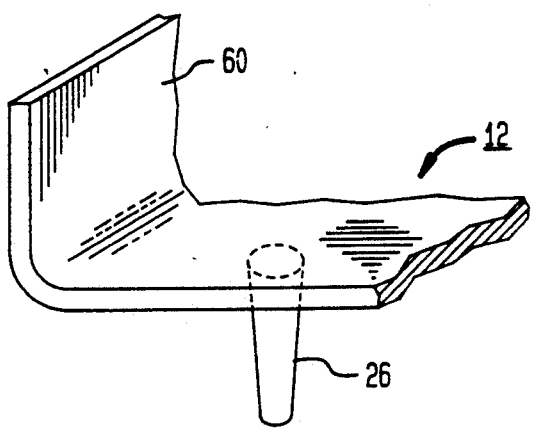
FIG. 5b

TIP OVER RESISTANT, DEBRIS RETAINING OMNI DIRECTIONALLY MOBILIZED RACK FOR WOOD LOGS

FIELD OF THE INVENTION

The present invention relates generally to the manual handling of a plurality of heavy elongated materials and more specifically to a mobile manually steerable rack for hauling, containing and storing fire wood.

BACKGROUND OF THE INVENTION

Description of The Prior Art

The prior art has generally been directed to the ever present problem of hauling and storing precut fire wood for use indoors in fireplaces and the like by homeowners. Homes are being built with ever increasing amounts of space and with a multiplicity of fireplaces therein. Today architects are increasingly designing homes with wood burning fireplaces, wood burning stoves, and wood furnaces to serve as a primary heating source for substantial spaces within the home. However, the loading, handling and storage of this wood as a source of energy for heat has been extremely difficult, dirty and hazardous for persons to pursue utilizing the devices of the prior art because of the difficulty mobilizing sufficient quantities of wood in prior art carts due to the inherent danger of tipping over and injuring a person using same and in using the prior art devices the accompanying litter and debris falling from the fire logs onto the floor of a person's home. In addition, many of the prior art devices are difficult to grip and maneuver and mechanically complex to build containing numerous parts.

Commonly used manual manipulative mechanisms for transporting various objects do not conveniently, if at all, serve reasonably the needs of the average person in bringing chopped wood from outdoors into a residence or the like and to position adjacent to a burning site for storage and progressive use without the danger being tipped over and without debris constantly falling to the floor from the fire logs as they are removed from the implement. As an example, a typical wheel-mounted fire log rack (one of which is disclosed in U.S. Pat. No. 4,264,081 issued on Apr. 28, 1981 to Markham) has a very high center of gravity and is easily tilted over and further does not provide any means whatsoever of preventing debris from littering the floor of the residence.

Typical of the carts patented in the 70's are U.S. Pat. Nos. 3,669,464 issued to Linzmeier and 3,841,651 issued in 1974 to Bigney. Each lacks any capacity for carrying and transporting logs and at the same time preventing the accumulation of debris underneath after use. The Bigney patent was not adapted at all for hauling and transporting fire logs. Although Linzmeier has a low center of gravity it is adapted primarily for carrying lumber, is composed of numerous parts and provides no means for preventing the accumulation of debris thereunder when used as a storage implement. Other pertinent prior art includes U.S. Pat. No. 4,793,624 issued in 1988 to Mace for a "small, lightweight, strong, multiple use cart having a removable vertical support for moving heavy items in or out of dwellings via a person size doorway; U.S. Pat. No. 4,326,731 issued on Apr. 27, 1982 to Woychio et al for a folding cart; U.S. Pat. No. 4,523,768 issued on Jun. 18, 1985 to Dluballa for a "collapsible cart-stand"; U.S. Pat. No. 4,488,733 issued on Dec. 18, 1984 to Hellsteen for a wheeled plate carrier and U.S. Pat. No. 4,679,805 issued on Jul. 14, 1987 to Cunningham for a space saver cart.

There are also various other utility carts proposed earlier in the prior art for household and other purposes that likewise have no reasonable adaptability to the hauling and storage of wood, for example, U.S. Pat. No. 2,472,989 and U.S. Pat. No. 3,021,011. This last patent proposes that a caster supported platform rack be provided for hauling a relatively long lengths of logs which comprises not only a debris catching concave platform but opposed open top U-shaped cradle members each in a common plane with a U-shaped support member to which the casters are pivotally connected. This platform is distinguishable from and inferior to the present invention in that it does not provide for ease of assembly and disassembly with at most a hammer in the manner presented by this novel invention.

SUMMARY OF THE INVENTION

The present invention provides fireplace implement for receiving, omnidirectionally mobilizing, and storing an array of fire logs with a substantially low center of gravity and in a manner which is substantially resistant to being tipped over and which prevents debris from falling from the logs while they are being mobilized, loaded and stored and which may be easily disassembled with at most a hammer when not in use and stored substantially flat. The cart comprises two low U-shaped members interconnected by a debris catching and interconnecting concave and confluent U-shaped platform having a plurality of cone shaped pegs located on each side thereof adapted to engage in an interference fit with predisposed matching apertures in each of the U-shaped members. Each U-shaped member has a pair of caster wheels which accommodate omnidirectional movement of the cart across the ground or the floor whether the cart is loaded or partially empty. The pegs are forcibly engaged and inserted into the predisposed apertures in each of the U-shaped members. The height of the U-shaped members is equal to or less than one half of the length of the member to insure a substantially low center of gravity whether the cart is empty or full.

OBJECTS OF THE INVENTION

In view of the foregoing it is the primary object of the present invention to provide a novel fireplace implement for hauling, receiving, omnidirectional mobilizing and storing precut wood for use within a home or the like which is easily assembled and disassembled.

Another paramount object of the novel invention is to provide a unique cart having a substantially low center of gravity and which is substantially tip over resistant and consists of only three part exclusive of the wheels.

A further significant object of the invention is peg interference engagement mechanism in combination with a concave debris catching member to provide assembly and rigidity to the cart and at the same time provide ease of disassembly.

A further object of the invention is to provide a novel fire wood cart which has ball endings on the upright members sized to accommodate the human hand such that the cart may be easily manipulated and mobilized without the necessity of gripping a handle.

It is yet a further important object of the invention to provide a novel fire wood cart which can be easily mobilized by a handicapped person without the necessity of fingers and hands and which may be assembled or disassembled without dexterity especially the use of screws, bolts and nuts.

These and other objects and features of the present invention will be apparent in the detailed description provided below with reference to the accompanying drawings, to wit:

BRIEF DESCRIPTION OF THE DRAWINGS

FIG. 1 is a perspective representation of a presently preferred fire wood cart according to the present invention;

FIG. 4 is a top view of the fire wood cart shown in FIG. 1 according to the present invention;

FIG. 5a is a front view of the fire wood cart of FIG. 1 loaded with fire wood;

FIG. 5b is an exaggerated perspective representation of a portion of the bottom concaved member of the fire wood cart showing one of the pegs used for assembly; and FIG. 5c is a cross section of a portion of the fire wood cart showing the details of an engagement between one of the cone shaped assembly pegs and the apertures in a U-shaped member.

DETAILED DESCRIPTION OF THE ILLUSTRATED EMBODIMENT

Figure 1:
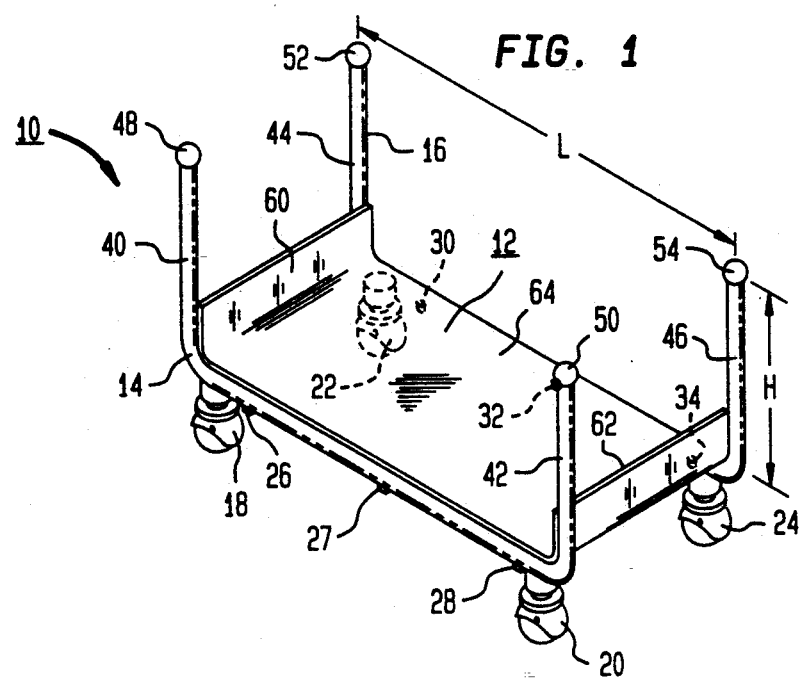
FIG. 1 is a perspective representation of a presently preferred fire

Reference is specifically made now to the drawings wherein like numerals are used to designate like parts throughout FIG. 1 through 5. There is shown in FIG. 1 a presently preferred embodiment of the invention, namely a fire place implement fabricated in accordance with the present invention. The implement is a cart 10. The cart 10 comprises a bottom 12, a first U-shaped member 14, a second U-shaped member 16, a first caster wheel 18, a second caster wheel 20 which make up a first pair of caster wheels attached to the U-shaped member 14. The cart 10 also comprises a caster wheel 22 and a caster wheel 24 which make up a second pair of caster wheels attached to the U-shaped member 16. The bottom 12 is adapted with a plurality of pegs 26, 27 and 28 located along the forward edge of the bottom 12 and which engage the U-shaped member 14 with an interference fit. A similar set of pegs 30, 32 and 34 are located along the distal edge 36 of the bottom 12 and engage the U-shaped member 16 in a manner which interconnects the U-shaped member 14 via the bottom 12 to the U-shaped member 16 and in addition holds the U-shaped members 14 and 16 in an upright orientation.

For ease of handling and maneuvering, each of the U-shaped members 14 and 16 has attached to the top of the upright portion thereof a means for mobilizing the cart without the use of fingers. In addition, the U-shaped upright members 14 and 16 are so massively adapted such that they may be mobilized by a handicapped person not having hands or the use thereof. In particular, the upright U-shaped member 14 has a vertical portion 40 on the right and a vertical portion 42 on the left. The U-shaped member 16 has an upright member 44 on the left and a right vertical member 46. Each of the vertical members 40, 42, 44 and 46 has attached to the top thereof a round ball shaped member such as for example ball shaped portions 48, 50, 52 and 54, respectively.

The bottom 12 is a concaved shaped member of the cart 10. The bottom 12 has a left inpanel 60 and a right inpanel 62 which are shown contiguously connected to a bottom panel 64 of the bottom member 12. The bottom panel 64 is substantially flat and is the portion of the member 12 which has intergerally connected thereto pegs 26, 27, 28, 30, 32, and 34. As shown in FIG. 1 the left and right side panel 60 and 62 are curved and adapted to congruently fit the curvature of the U-shaped members 14 and 16. As further shown in FIG. 1 the height of the vertical post 40, 42, 44 and 46 is illustrated by the designation H. A separation between two vertical posts of a U-shaped member is designated by the simbol L. For example, the post 44 is shown separated a distance L from the post 46, each post comprising a vertical member of the U-shaped member 16.

An essential aspect of the invention is that the height of the vertical members 40, 42, 44 and 46 be equal and of a length or height H which is equal to or less than one half of the length L.

Figure 2:
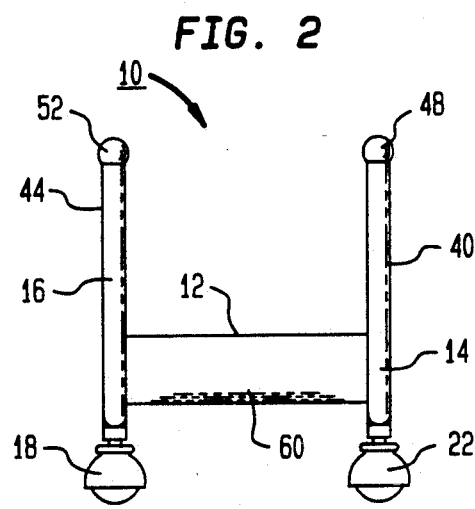
FIG. 2 is a left side view of the fire wood cart shown in FIG. 1.

Referring now to FIG. 2 there is shown the left side of the cart 10 wherein the left curved panel 60 of the bottom 12 is illustrated bracketed by the vertical portion 44 of the U-shaped member 16 and the vertical portion 40 of the U-shaped member 14.

Figure 3:
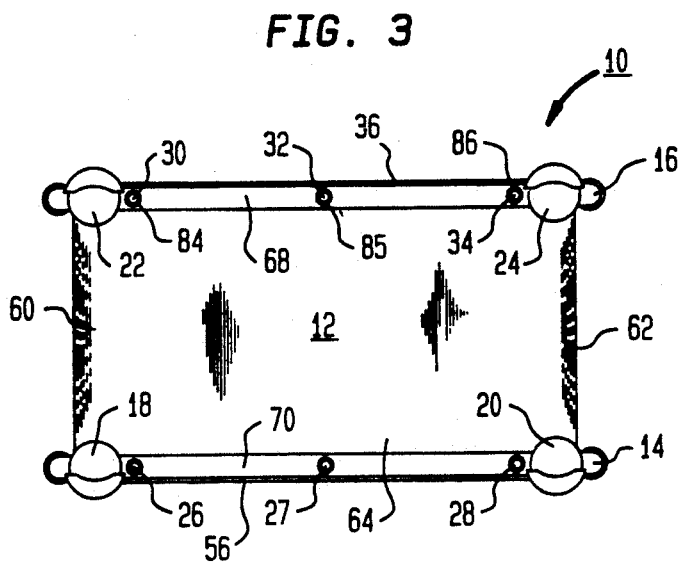
FIG. 3 is a bottom view of the fire wood cart according to the present invention in accordance with FIG. 1.

In FIG. 4 a bottom view of the cart in FIG. 1 illustrates the protruding conically shaped pegs 26, 27, 28 30, 32, and 34. The bottom 12 has a frontal edge 56 as well as the distal edge 36. Along the distal edge the conical pegs 30, 32 and 34 are equally spaced such that they extend through the bottom portion 68 of the U-shaped member 16 which lies in between the wheels 20 and 22 attached thereto. The conical pegs 26, 27, and 28 are also shown equally spaced and protruding through the bottom portion 70 of the U-shaped member 14 and located in between the wheels 18 and 20. Also shown in FIG. 3 is the left panel 60 of the bottom 12 and the right panel 62 of the bottom 12. The panels 60 and 62 were interconnected by the flat bottom portion 64.

Referring now to FIG. 4 there is shown the fireplace cart 10 loaded with logs 80. The logs sit and are supported by the bottom 12 as well as being retained by the side portions 60 and 62.

Referring now to FIG. 5a there is shown a front view of the cart 10 fully loaded with logs 80. Note that in FIG. 5 the conical spaced pegs 26, 27 and 28 are shown extending from the bottom member 12 through the front U-shaped member 14. The U-shaped member 14 has conically shaped apertures 81, 82 and 83 adapted to receive the conical pegs 26, 27 and 28 respectively in a tight fit. Similarly, the conical pegs 30, 32 and 34 as shown in FIG. 3 are adapted to be received by apertures 84, 85 and 86 in the U-shaped member 16 in a very tight interference fit as shown in FIG. 3. A more detailed exaggerated illustration of the peg 26 for example is shown in FIG. 5b. There the peg 26 is shown in an exaggerated conical shape attached to the bottom 12 and in integral part thereof and with a side panel 60 partially shown.

Referring now to FIG. 5c the bottom portion 70 of the U-shaped member 14 is shown in great detail with the peg 26 extending through the aperture 81 in the U-shaped member 14. The U-shaped member 14 is made of heavy gauge steel which is hollow. The peg 26 as well as the bottom member 12 is made of iron of heavy steel and is solid. Typically the bottom member 12 weighs approximately 15 to 20 pounds and each of the U-shaped members 14 and 16 weighs approximately 10 to 15 pounds. The length L of the cart is approximately 3 to 4 feet and the height H is accordingly one half of the length L.

The pegs such as for example the peg 26 is illustrated in FIG. 5 is conical in shape and the aperture 81 adapted to receive the peg 26 is conical in shape to provide a wedge fit and wedging action between the U-shaped member 14 and the conical peg 26 and similarly for the other pegs and the corresponding receiving U-shaped member. This arrangement facilitates a very stable structure and because the wedge action encourages an interference fit when assembled with a hammer whereby the bottom member 12 is hammered onto the U-shaped members 14 and 16 the bottom 12 fits very tightly onto the U-shaped members 14 and 16 maintaining these U-shaped members in an upright position and maintaining the structural integrity of the cart without the necessity of screws, bolts, clamps and the like. Moreover, the cart may be easily disassembled for storage with a hammer simply by dislodging the steel or iron concaved bottom member 12 from the U-shaped upright members 14 and 16. This can also be facilitated by means of a large screwdriver or crowbar. When disassembled the U-shaped members 14, 16 and 12 may all be oriented vertically or hung on a garage wall for storage.

The wheels 18, 20, 22 and 24 are standard heavy duty ball shaped caster wheels mounted to the bottoms 68 and 70 of the U-shaped member 16 and 14 respectively in a conventional manner.

The invention may be embodied in other specific forms without departing from the spirit or the essential characteristics which may be deemed equivalents thereof. The present embodiment is therefore considered in all respects as illustrative and not restrictive, the scope of the invention being indicated by the independent claims rather than by the foregoing description and all changes which come within the meaning and range of equivalency of the claims under the doctrine of equivalents are therefore intended to be embraced therein.

What is claimed is:

1. A fireplace implement for receiving, omni-directionally mobilizing, and storing adjacent a fireplace a horizontally elongated stack of conventionally cut firelogs of conventional width, said stack being made of a horizontally directed array of alligned pieces of firelogs the fireplace implement having a height and a length, the implement further comprising a first member disengageably frictionally connected to a third member, a second member, said second member disengageably frictionally connected to said third member, said first, second, and third members interconnected into an assembly; said first and second members each having a bottom, said assembly providing a center of gravity for the array and implement combined, said center of gravity being located at approximately one half of the length for said implement and wherein said center of gravity is further located such that one half of the length is equal to or greater than said height; said assembly further comprising said first member oriented uprightly and U-shaped; a catching means for catching debris falling from said firelogs said third member being comprised of said catching means, said catching means also interconnecting the bottom of said first member to the bottom of said second member; said first member having a first pair of curved portions, one curved portion connecting a first frontal vertical post to a first horizontal portion connected to the bottom of said first member; and the other curved portion connecting a first distal vertical post to said first horizontal portion; said second member having a second pair of curved portions, one of said second pair of curved portions connecting a second frontal vertical post to a second horizontal portion connected to the bottom of said second member, the other curved portion of said second pair connecting a second distal vertical post to said second horizontal portion; a first omni-directional wheeling means for said implement attached to a frontal end of said first horizontal member; a second omni-directional wheeling means for said implement attached to a distal end of said first horizontal member; a third omni-directional wheeling means for said implement attached to a frontal end of said second horizontal member, a fourth omni-directional wheeling for said implement attached to a distal end of said second horizontal member; a first curved member adapted to further contain debris from said array connected to said catching means, said first curved member having ends adapted to be congruent with said frontal curved portions and interconnect said curved portions and confluently connect to said catching means; a second curved member having ends adapted to be congruent with said curved portions and interconnect said curved portions and confluently connect to said catching means, said catching means having a plurality of downwardly protruding pegs located near a first edge of said catching means and another plurality of downwardly protruding pegs located near a second edge of said catching means, said first and second members each being tubular and each having apertures therethrough adapted to receive said pegs, said pegs being disengageably frictionally held in said apertures located in said first and second members whereby said implement in manually separable into said first, second, and third members without tools.

2. A fireplace implement for receiving, omni-directionally mobilizing, and storing adjacent a fireplace a horizontally elongated stack of conventionally cut firelogs of conventional width, said stack being made up of horizontally directed array of alligned pieces of firelogs, comprising a first member disengageably frictionally connected to a third member, a second member, the second member disengageably frictionally connected to said third member, the first, second and third members being interconnected into an assembly, the assembly comprising a first means for providing a center of gravity for the array and implement combined, said center of gravity being located at approximately one half of the length for said implement and wherein said center of gravity is further located such that one half of the length is equal to or greater than said height, said first means comprising the first member and the second member each oriented upright and U-shaped; said first and said second member each having a bottom connected to the third member; a second means for catching debris falling from said firelogs, said second means having a bottom panel interconnecting the bottom of said first member to the bottom of said second member, said first member having a first pair of curved portions, one curved portion connecting a first frontal vertical post to a first horizontal portion connected to the bottom of said first member; and the other curved portion connecting a first distal vertical portion to said first horizontal portion, said second member having a second pair of curved portions, one of said second pair of curved portions connecting a second frontal vertical post to a second horizontal portion connected to the bottom of said second member, the other curved portion of said second pair connecting a second distal vertical post to said second horizontal portion, a first omni-directional wheeling means for said implement attached to a frontal end of said first horizontal member, a second omni-directional wheeling means for said implement attached to a distal end of said first horizontal member, a third omni-directional wheeling means for said implement attached to a frontal end of said second horizontal member, a fourth omni-directional wheeling for said implement attached to a distal end of said second horizontal member, a first curved planar member adapted to contain and divert debris from said array, said first curved planar member having ends adapted to be congruent with said curved portions and interconnect with curved portions and confluently connect to said second means, a second curved planar member adapted to contain and divert debris from said array, said second curved planar member having ends adapted to be congruent with said curved portions and interconnect said distal curved portions and confluently connect to said second means, said implement being adapted to be moved in any direction and to substantially prevent debris from said array from falling underneath said implement; the fireplace implement further comprising said posts topped with integral ball-shaped handles in combination with a peg means for enabling toolless assembly and disassembly of said implement, said peg means for enabling toolless assembly and disassembly of said implement further comprising a plurality of downwardly extending conical pegs formed on the bottom of said third member and a like plurality of matching apertures located in the bottom of said first member and in the bottom of said second member, said first and second members having bottoms and formed from cylindrical material, said apertures being adapted to receive said pegs, each of said apertures being further adapted to congruently frictionally engage said pegs, said apertures extending vertically through the respective bottoms of said first and second members.

3. The improved fireplace implement of claim 2 wherein said first and second members are made of tubular steel and said third member is made of heavy gauge steel.

* * * * *